(12) United States Patent
Ozawa et al.

(10) Patent No.: US 7,358,858 B2
(45) Date of Patent: Apr. 15, 2008

(54) ROAD-ICE DETECTING SENSOR, METHOD FOR INSTALLING SAME, AND ROAD-ICE DETECTING METHOD

(75) Inventors: Yoshihiro Ozawa, Tomisato (JP); Katsunori Shinoda, Narita (JP); Mitsuo Suzuki, Tokyo (JP); Hisaaki Kawaguchi, Tokyo (JP); Hajime Kato, Hitachi (JP)

(73) Assignees: Narita International Airport Corporation, Narita (JP); Sanki Engineering Co., Ltd., Tokyo (JP)

( * ) Notice: Subject to any disclaimer, the term of this patent is extended or adjusted under 35 U.S.C. 154(b) by 432 days.

(21) Appl. No.: 11/082,362

(22) Filed: Mar. 17, 2005

(65) Prior Publication Data

US 2005/0206526 A1 Sep. 22, 2005

(30) Foreign Application Priority Data

Mar. 17, 2004 (JP) ............................. 2004-076315

(51) Int. Cl.
*G08B 19/02* (2006.01)

(52) U.S. Cl. .............. 340/580; 73/170.26; 250/227.17; 385/12; 385/37; D99/99

(58) Field of Classification Search ................ 340/580; 385/12, 37; 73/170.26; 250/227.17, 227.18; D99/99
See application file for complete search history.

(56) References Cited

U.S. PATENT DOCUMENTS

| | | | | |
|---|---|---|---|---|
| 5,493,390 A | * | 2/1996 | Varasi et al. .................. 356/32 |
| 5,889,901 A | * | 3/1999 | Anderson et al. ............. 385/12 |
| 5,892,860 A | * | 4/1999 | Maron et al. .................. 385/12 |
| 6,115,122 A | * | 9/2000 | Bao et al. ..................... 356/480 |
| 6,118,914 A | * | 9/2000 | Davis et al. ................... 385/37 |
| 6,668,126 B2 | * | 12/2003 | Knox et al. .................. 385/135 |
| 6,865,194 B1 | * | 3/2005 | Wright et al. .................. 372/6 |
| 7,038,190 B2 | * | 5/2006 | Udd et al. ............. 250/227.11 |
| 7,083,190 B2 | * | 8/2006 | Clark et al. .................. 280/734 |
| 2004/0136647 A1 | * | 7/2004 | Mizuno et al. ............... 385/24 |

FOREIGN PATENT DOCUMENTS

| | | |
|---|---|---|
| JP | 5-71111 | 3/1993 |
| JP | 10-104363 | 4/1998 |
| JP | 10-141922 | 5/1998 |
| JP | 2000-241563 | 9/2000 |

(Continued)

*Primary Examiner*—Jeffery Hofsas
*Assistant Examiner*—Edny Labbees
(74) *Attorney, Agent, or Firm*—Winstead PC

(57) ABSTRACT

A road-ice detecting sensor includes: a temperature sensing member of T shape made of a highly heat conductive metal, having a temperature sensor to be grounded onto a road and a fin part erected from this temperature sensor; an optical fiber having an FBG bonded onto the fin part of the temperature sensing member; and a case having a heat insulating member surrounding the fin part of the temperature sensing member and the optical fiber. A plurality of number of the read-ice detecting sensors are installed on a road, connected to one another via an optical cable. Pulsed light is launched into one of the ends of the optical cable, and beams of reflected light from the respective road-ice detecting sensors are received to measure the road temperature.

16 Claims, 7 Drawing Sheets

FOREIGN PATENT DOCUMENTS

| | | |
|---|---|---|
| JP | 2001-042142 | 2/2001 |
| JP | 2001-194249 | 7/2001 |
| JP | 2001-228263 | 8/2001 |
| JP | 2003-254838 | 9/2003 |
| JP | 2003-344183 | 12/2003 |

* cited by examiner 1 (ROAD-ICE DETECTING SENSOR)

ROAD-ICE DETECTING SENSOR, METHOD FOR INSTALLING SAME, AND ROAD-ICE DETECTING METHOD

CROSS REFERENCE TO RELATED APPLICATION

This application is based upon and claims the benefit of priority from Japanese Patent Application No. 2004-076315, filed on Mar. 17, 2004, the entire contents of which are incorporated herein by reference.

BACKGROUND OF THE INVENTION

1. Field of the Invention

The present invention relates to a road-ice detecting sensor intended for a runway, a road, etc., utilizing a fiber Bragg grating (FBG) which varies in the peak wavelength in light reflex according to strain, an installation method for the road-ice detecting sensor, and a road-ice detecting method.

2. Description of the Related Art

There are known road anti-icing systems in which optical-fiber road temperature sensors are arranged in the ground in the longitudinal direction of a road (for example, see Japanese Unexamined Patent Application Publication Nos. Hei 5-71111, Hei 10-104363, 2000-241563, and 2001-228263).

Temperature sensors using optical cables with FBGs are also known (for example, see Japanese Unexamined Patent Application Publication Nos. Hei 10-141922, 2001-42142, 2001-194249, 2003-254838, and 2003-344183).

The foregoing road antiicing systems, however, cannot directly sense the temperature of the road surface because they are arranged underground in the longitudinal direction of the road. Also, it is a problem that the systems have to be removed and reinstalled upon every periodic road repair.

As for the FBG-based temperature sensors, they also have a problem that they cannot measure accurate temperature if the FBGs are uncovered and subjected to external stress or dew condensation which changes the detection signals, and they cannot directly sense the temperature of the road surface. Another problem is that with the FBGs entirely fixed to a stationary member, uneven adhesion or variations in FBG expansion may occur, hindering stable temperature measurement.

Moreover, as for temperature sensors having their FBGs covered with tubular protective members, they measure the temperature of the air around the protective members because air temperature is transmitted from the protective members to the FBGs through the air inside the protective members. Consequently, if these temperature sensors are applied to a road antiicing system, what they measures the atmospheric temperature of the road, not the temperature of a subject road surface. It is problematic that they cannot directly sense the temperature of the road surface.

SUMMARY OF THE INVENTION

It is an object of the present invention to extend the range of applications of an FBG-based temperature sensor.

Another object of the present invention is to provide a road-ice detecting sensor which can sense the temperature of a road surface directly and is easily detachable/attachable when the road or road surface is under periodic repairs, and to provide a method for installing the same.

Still another object of the present invention is to provide a road-ice detecting method for directly sensing the temperature of a road surface.

A road-ice detecting sensor according to the present invention includes: a temperature sensing member being T-shaped, made of a highly heat conductive metal, and having a temperature sensor to be grounded onto a road and a fin part erected on this temperature sensor; an optical fiber having a fiber Bragg grating (FBG) bonded onto the fin part of the temperature sensing member, the FBG with a peak wavelength in light reflex varying according to strain; and a case having a heat insulating member surrounding the fin part of the temperature sensing member and the optical fiber.

A method for installing a road-ice detecting sensor according to the present invention includes the steps of: placing the temperature sensor of the road-ice detecting sensor of the present invention on a road; placing a plate member over the case of the road-ice detecting sensor; and fastening the plate member and the road with a bolt.

According to another aspect of the method for installing a road-ice detecting sensor according to the present invention, the method includes the steps of: placing the temperature sensor of the road-ice detecting sensor of the present invention on a road; placing a plate member of a dome shape over the case of the road-ice detecting sensor; and fastening the plate member and the road with a bolt.

According to still another aspect of the method for installing a road-ice detecting sensor according to the present invention, the method includes the steps of: placing the temperature sensor of the road-ice detecting sensor of the present invention on a road; attaching L fittings to both sides of the case of the road-ice detecting sensor; and fastening the L fittings and the road with bolts.

According to still another aspect of the method for installing a road-ice detecting sensor according to the present invention, the method includes the steps of: placing the case on a road such that the temperature sensor directs to the air; and disposing a roof member for radiational cooling above the temperature sensor.

Another road-ice detecting sensor according to the present invention includes: a road-specific ice detecting sensor unit including a temperature sensing member being T-shaped, made of a highly heat conductive metal, and having a temperature sensor to be grounded onto a road surface and a fin part erected on this temperature sensor; and an optical fiber having a fiber Bragg grating (FBG) with a peak wavelength in light reflex according to strain, the FBG being bonded onto the fin part of the temperature sensing member; an outdoor air temperature detecting sensor unit including a temperature sensing member being T-shaped, made of a highly heat conductive metal, and having an outdoor air temperature sensor disposed directing to the air and a fin part erected on this outdoor air temperature sensor; and an optical fiber having an FBG bonded onto the fin part of the temperature sensing member; and side plates having a heat insulating member surrounding the fin parts and optical fibers of the road-specific ice detecting sensor unit and the outdoor air temperature detecting sensor unit. The road-specific ice detecting sensor unit and the outdoor air temperature detecting sensor unit are attached to the side plates such that their FBGs face to each other.

Another method for installing a road-ice detecting sensor according to the present invention includes the steps of: placing the temperature sensor of the road-specific ice detecting sensor unit of the another road-ice detecting sensor of the present invention on a road; attaching L fittings to both sides of the side plates; and fastening the L fittings and the road with bolts.

According to another aspect of the another method for installing a road-ice detecting sensor according to the present invention, the method includes the step of: disposing a roof member for radiational cooling above the outdoor air temperature sensor of the outdoor air temperature detecting sensor unit.

A road-ice detecting method according to the present invention includes the steps of: placing a predetermined number of the road-ice detecting sensors or the another road-ice detecting sensors both of the present invention on a road according to the method for installing a road-ice detecting sensor according to the present invention; connecting the road-ice detecting sensors via an optical cable; launching pulsed light into one end of the optical cable; and receiving beams of reflected light from the respective road-ice detecting sensors to measure the temperature of the road.

According to the present invention, the temperature sensor and the connected fin part are formed integrally of a highly heat conductive metal. The temperature sensor is installed directly on the road as a subject of temperature detection. Therefore, the present invention is able to sense the road temperature more accurately than conventional road temperature detecting sensors by quickly, surely propagating the strain of the temperature sensor in the longitudinal direction due to temperature variations to the FBG which is fixed to the fin part.

Furthermore, according to the present invention, the road-ice detecting sensor can be installed directly on the road so that it is insusceptible to repair works to the road. This can accordingly reduce to a minimum the amount of operations for reinstallation of the optical cable and road paving at every road repair work.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
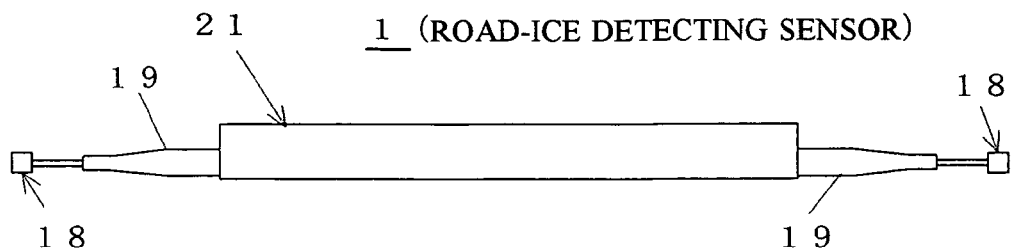
FIG. 1 is a side view of a road-ice detecting sensor according to a first embodiment of the present invention.
Figure 2:
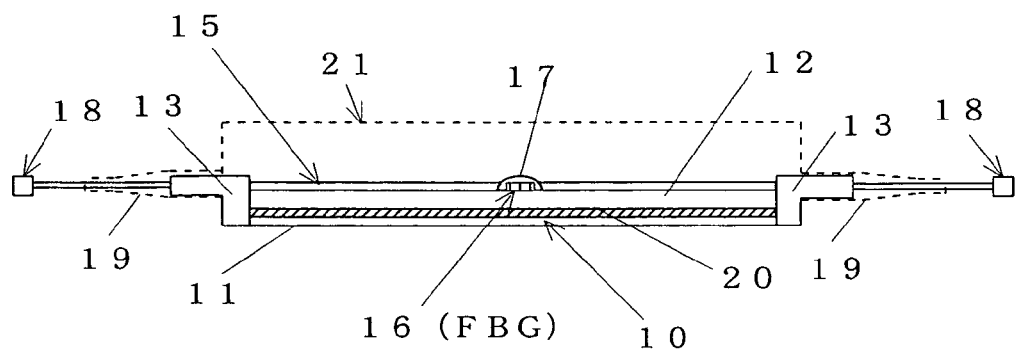
FIG. 2 is a partly-broken side view of FIG. 1.
Figure 3:
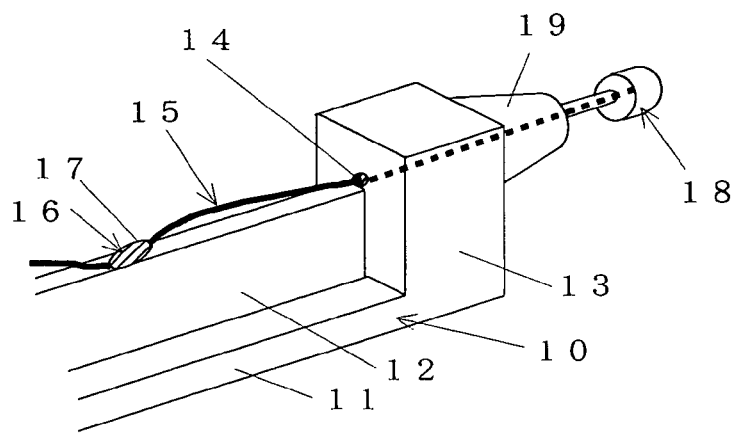
FIG. 3 is an enlarged perspective view showing essential parts of FIG. 2.
Figure 4:
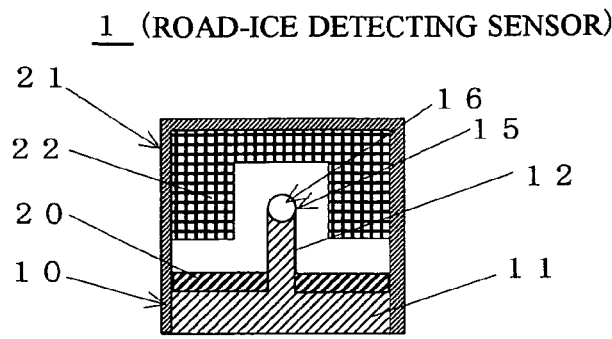
FIG. 4 is a cross-sectional view of FIG. 1.

Hereinafter, the present invention will be described in conjunction with embodiments shown in the drawings.

FIGS. 1 to 4 show a road-ice detecting sensor according to a first embodiment of the present invention.

The road-ice detecting sensor 1 according to the present embodiment includes a temperature sensing member 10 of T shape, made of a highly heat conductive metal (such as aluminum, an aluminum alloy, copper, and a copper alloy). The temperature sensing member 10 has a temperature sensor 11 of plate shape to be grounded onto a road that is targeted for ice detection, and a fin part 12 of plate shape which is integrally erected on a central portion of this temperature sensor 11.

Block-shaped end members 13, each having an optical fiber through hole 14, are formed integrally on both ends of this temperature sensing member 10. An optical fiber 15 having a fiber Bragg grating (FBG) 16, which varies in the peak wavelength in light reflex according to strain, is fixed onto the fin part 12 of the temperature sensing member 10 by bonding the FBG 16 with an adhesive 17 which is usable at −10° C. to 80° C. Both ends of the optical fiber 15 are protruded from the end members 13 via the optical fiber through holes (or grooves) 14, and connected to optical connectors 18. Incidentally, in the optical fiber through holes (or grooves) 14, the periphery of the inserted optical fiber 15 is sealed with the same adhesive as the adhesive 17 or a silicone rubber gel (one-component room temperature setting type). The protrusions of the optical fiber 15 from the end members 13 are covered with protective covers 19 (made of such material as a rubber, a synthetic rubber, and a soft resin) which are fixed to the end members 13. The temperature sensing member 10 having the optical fiber 15 bonded thereto is coated with a waterproof gel 20 (such as a silicone rubber of one-component room temperature setting type) over the temperature sensor 11. A case 21 for surrounding the fin part 12 and the optical fiber 15 is attached thereto. The case 21 is made of a metal or a synthetic resin, and a heat insulator 22 made of a synthetic resin is arranged inside. The case 21 is bolted to the end members 13.

Figure 5:
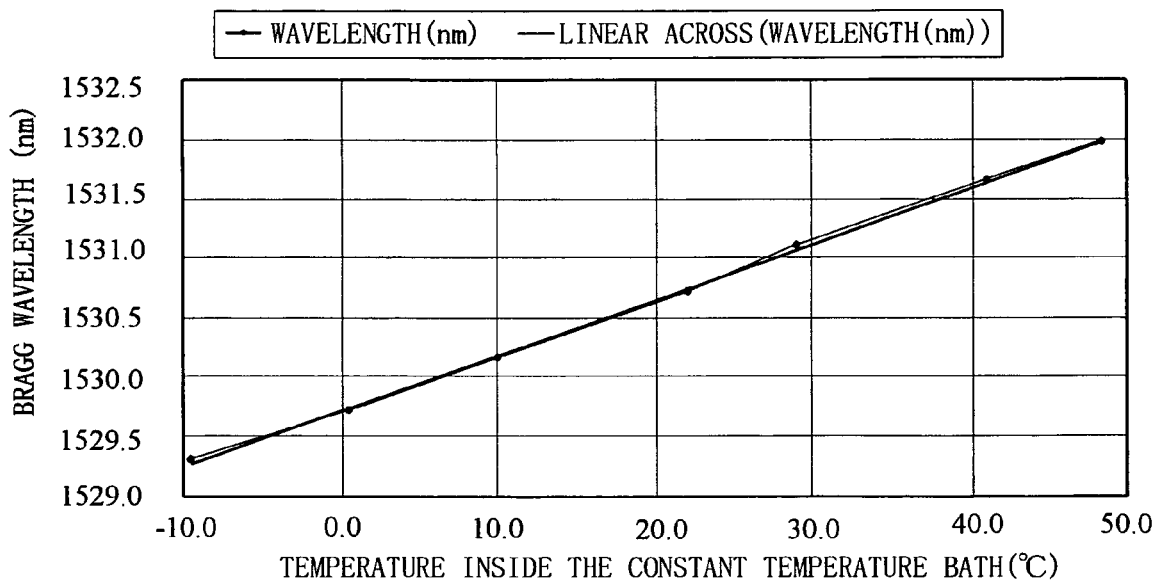
FIG. 5 is a graph showing the temperature characteristic of the road-ice detecting sensor of FIG. 1.

FIG. 5 shows an example of a temperature characteristic of the road-ice detecting sensor 1 according to the present embodiment. The abscissa indicates the temperature applied to the road-ice detecting sensor 1. The ordinate indicates the amount of shift of the Bragg wavelength of the FBG 16, or the output of the road-ice detecting sensor 1. The output wavelength shown here is for situations where the road-ice detecting sensor 1 is placed in a constant temperature bath and the temperature inside the constant temperature bath is changed. Here, the center wavelength is 1530 nm. As is evident from FIG. 5, the output is generally linear across the range of −10° C. and 50° C. This shows that stable temperature measurement is available.

According to the road-ice detecting sensor 1 of the present embodiment having the foregoing configuration, the temperature sensor 11 is grounded onto the road targeted for ice detection. As a result, the temperature of the grounded surface is transmitted quickly to the FBG 16 on the fin part 12 through the temperature sensor 11. The FBG 16 varies in the peak wavelength in light reflex according to strain. The temperature of the road targeted for ice detection can thus be sensed and transmitted via the optical connectors 18 to an optical wavelength measuring device in optical-cable connection.

According to the road-ice detecting sensor 1 of the present embodiment, the temperature sensor 11 can surely transmit the strain resulting from temperature variations in the longitudinal direction. In addition, the fin part 12 connected thereto has the straight fin shape for enhanced heat conduction so that it can transmit, to the FBG 16 with reliability, the strain due to temperature variations detected by the temperature sensor 11.

According to the road-ice detecting sensor 1 of the present embodiment, the case 21 encloses all the components except the temperature sensor 11, and the heat insulator 22 inside the case 21 prevents the outdoor air temperature from affecting the temperature therein. The FBG 16 can thus detect the temperature of the road targeted for ice detection accurately.

According to the road-ice detecting sensor 1 of the present embodiment, the waterproof gel 20 (such as a silicone rubber of one-component room temperature setting type) prevents water from penetrating via the interface between the heat insulator 22 and the temperature sensor 11. It is therefore possible to avoid water penetration and prevent the optical fiber 15 from being immersed in water with a drop in transmission efficiency.

Next, description will be given of how to install the road-ice detecting sensor 1 according to the present embodiment.

Figure 6:
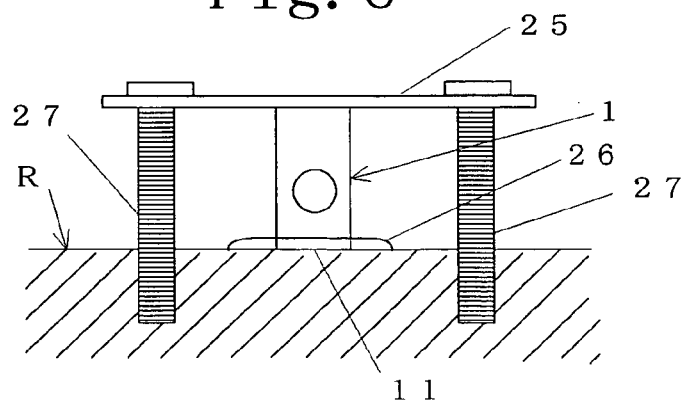
FIG. 6 is a diagram showing a method for installing the road-ice detecting sensor of FIG. 1.

FIG. 6 shows a first method for installing the road-ice detecting sensor 1 according to the present embodiment.

Initially, the temperature sensor 11 of the road-ice detecting sensor 1 is placed on the road R, and a caulking compound 26 for avoiding air exchange with the outside is arranged around the temperature sensor 11. Next, a SUS or other metal plate member 25 is placed over the case 21 of the road-ice detecting sensor 1. Bolts 27 are driven into the road R from above the plate member 25, thereby holding down the road-ice detecting sensor 1 with the plate member 25. Consequently, the bolts 27 function as anchors.

Figure 7:
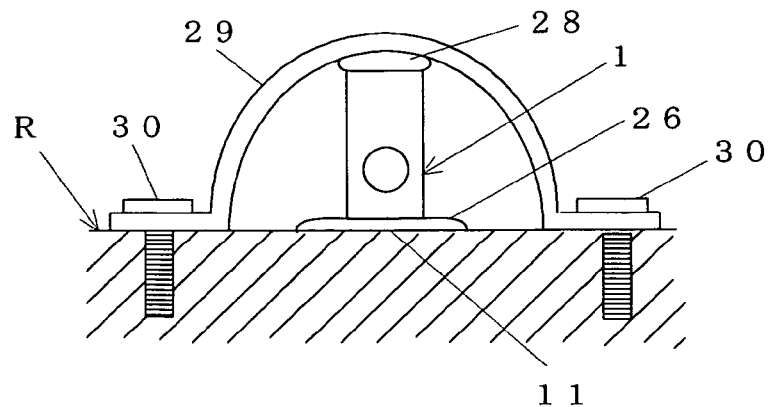
FIG. 7 is a diagram showing a method for installing the road-ice detecting sensor of FIG. 1.

FIG. 7 shows a second method for installing the road-ice detecting sensor 1 according to the present embodiment.

Initially, the temperature sensor 11 of the road-ice detecting sensor 1 is placed on the road R, and a caulking compound 26 for avoiding air exchange with the outside is arranged around the temperature sensor 11. A cushion member 28 is put on the case 21 of the road-ice detecting sensor 1, and a plate member 29 of dome shape is placed thereon. Bolts 30 are driven into the road R from above the plate member 29, thereby holding down the road-ice detecting sensor 1 with the plate member 29. Consequently, the bolts 30 function as anchors.

Figure 8:
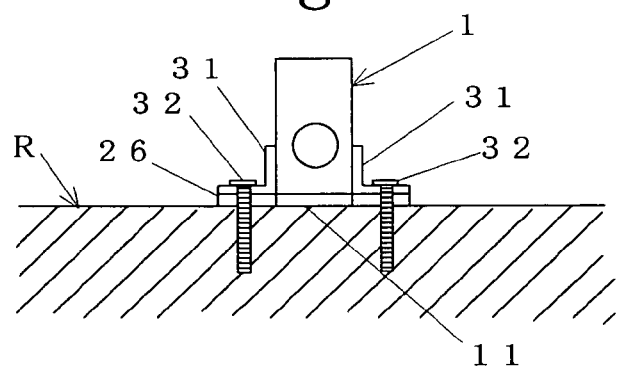
FIG. 8 is a diagram showing a method for installing the road-ice detecting sensor of FIG. 1.

FIG. 8 shows a third method for installing the road-ice detecting sensor 1 according to the present embodiment.

Initially, the temperature sensor 11 of the road-ice detecting sensor 1 is placed on the road R, and a caulking compound 26 for avoiding air exchange with the outside is arranged around the temperature sensor 11. L fittings 31 such as SUS angles are arranged on both sides of the case 21 of the road-ice detecting sensor 1. Bolts 32 are driven into the road R from above the L fittings 31, thereby holding down the road-ice detecting sensor 1 with the L fittings 31. Consequently, the bolts 32 function as anchors.

As above, according to the first to third methods of installing the road-ice detecting sensor 1 shown in FIGS. 6 to 8, the temperature sensor 11 of the road-ice detecting sensor 1 is firmly fixed to the road targeted for ice detection. The FBG 16 can thus detect the temperature of the road targeted for ice detection accurately.

Since the road-ice detecting sensor 1 is simply placed and fixed on the road, it will not require much labor for removal or relocation during repair works of the road, and it will eliminate the necessity to wire the optical cable again.

Figure 9:
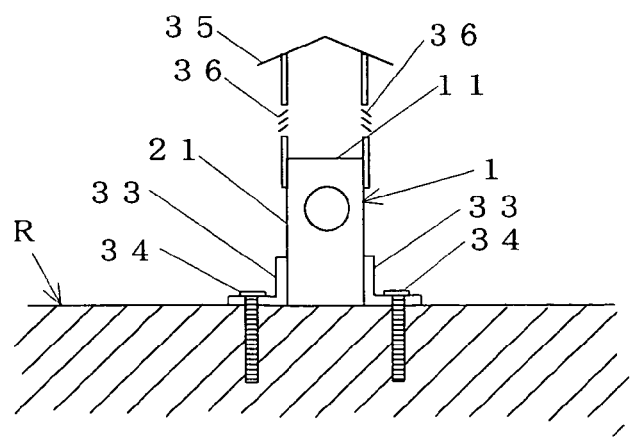
FIG. 9 is a diagram showing a method for installing the road-ice detecting sensor of FIG. 1.

FIG. 9 shows a fourth method for installing the road-ice detecting sensor 1 according to the present embodiment. This installation method is applied to the cases where the road-ice detecting sensor 1 is used to measure the outdoor air temperature.

Initially, the top face of the case 21 opposite from the temperature sensor 11 is placed on the road R. L fittings 33 such as SUS angles are arranged on both sides of the case 21 of the road-ice detecting sensor 1. Bolts 34 are driven into the road R from above the L fittings 33, thereby holding down the road-ice detecting sensor 1 with the L fittings 33. Consequently, the bolts 34 function as anchors. Next, a roof member 35 for radiational cooling is disposed above the temperature sensor 11. The roof member 35 has ventilation louvers 36 in its walls.

According to this installation method, the roof member 35 can surely prevent radiation from the road targeted for ice detection. The FBG 16 can thus accurately detect the outdoor air temperature on the road targeted for ice detection.

Figure 10:
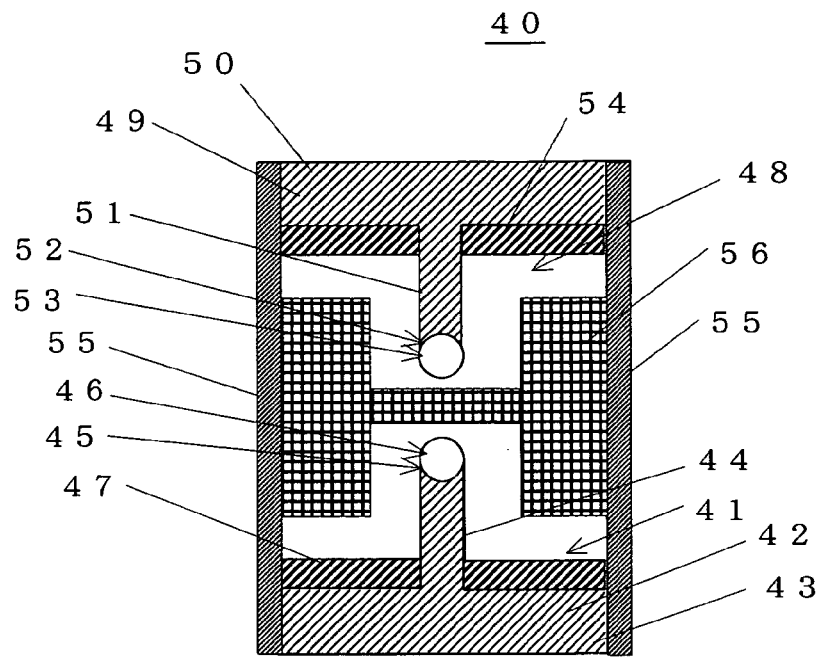
FIG. 10 is a cross-sectional view of a road-ice detecting sensor according to a second embodiment of the present invention.

FIG. 10 shows a road-ice detecting sensor according to a second embodiment of the present invention.

The road-ice detecting sensor 40 according to the present embodiment differs from the road-ice detecting sensor 1 according to the first embodiment in that a road-specific ice detecting sensor unit 41 and an outdoor air temperature detecting sensor unit 48 are provided at the bottom and top, respectively.

In the present embodiment, the road-specific ice detecting sensor unit 41 includes a temperature sensing member 42 of T shape, made of a highly heat conductive metal (such as aluminum, an aluminum alloy, copper, and a copper alloy). The temperature sensing member 42 has a temperature sensor 43 of plate shape to be grounded onto a road that is targeted for ice detection, and a fin part 44 of plate shape which is integrally erected on a central portion of this temperature sensor 43.

As in the first embodiment, block-shaped end members, each having an optical fiber through hole or groove, are formed integrally on both ends of this temperature sensing member 42. As in the first embodiment, an optical fiber 45 having an FBG 46 is fixed onto the fin part 44 of the temperature sensing member 42 by bonding the FBG 46 with an adhesive which is usable at −10° C. to 80° C. As in the first embodiment, both ends of the optical fiber 45 are protruded from the end members via the optical fiber through holes or grooves, and connected to optical connectors. As in the first embodiment, the periphery of the inserted optical member 45, in the optical fiber through holes or grooves, is sealed with the same adhesive as the adhesive or a waterproof gel (such as a silicone rubber of one-component room temperature setting type). As in the first embodiment, the protrusions of the optical fiber 45 from the end members are covered with protective covers (made of such material as a rubber, a synthetic rubber, and a soft resin) which are fixed to the end members. The temperature sensing member 42 having the optical fiber 45 bonded thereto is coated with a waterproof gel 47 (such as a silicone rubber of one-component room temperature setting type) over the temperature sensor 43.

Meanwhile, the outdoor air temperature detecting sensor unit 48 has almost the same configuration, though upside down, as that of the road-specific ice detecting sensor unit 41. A temperature sensing member 49 has an outdoor air temperature sensor 50 to direct to the air, and a fin part 51 which is erected on this outdoor air temperature sensor 50. An optical fiber 52 having an FBG 53 is fixed to the fin part 51 by adhesive bonding. The temperature sensing member 49 has the optical fiber 52 bonded thereto, and the outdoor air temperature sensor 50 thereof is coated with a waterproof gel 54 (such as a silicone rubber of one-component room temperature setting type).

The rest of the configuration is the same as that of the road-specific ice detecting sensor unit 41.

The road-specific ice detecting sensor unit 41 and the outdoor air temperature detecting sensor unit 48 are sandwiched by side plates 55 between which a heat insulator 56 is arranged.

According to the present embodiment, the temperature sensor 43 is grounded onto the road targeted for ice detection as in the first embodiment. As a result, the temperature of the ground surface is transmitted to the FBG 46 on the fin part 44 through the temperature sensor 43 quickly. The FBG 46 varies in the peak wavelength in light reflex according to strain. The temperature of the road targeted for ice detection can thus be detected and transmitted via the optical connectors to an optical wavelength measuring device in optical-cable connection. The components other than the temperature sensor 43 are surrounded by the side plates 55 and the heat insulator 56, and the heat insulator 56 prevents the outdoor air temperature from affecting the temperature therein. The FBG 46 can thus sense the temperature of the road targeted for ice detection accurately.

Meanwhile, in the outdoor air temperature detecting sensor unit 48, the outdoor air temperature sensor 50 is exposed to the air. As a result, the outdoor air temperature is transmitted to the FBG 53 on the fin part 51 through the outdoor air temperature sensor 50 quickly. The FBG 53 varies in the peak wavelength in light reflex according to strain, whereby the outdoor air temperature can be detected and transmitted via the optical connectors to an optical wavelength measuring system in optical-cable connection. The components other than the outdoor air temperature sensor 50 are surrounded by the side plates 55 and the heat insulator 56, and the heat insulator 56 prevents the outdoor air temperature from affecting the temperature therein. The FBG 53 can thus sense the outdoor air temperature accurately.

Next, description will be given of how to install the road-ice detecting sensor 40 according to the present embodiment.

Figure 11:
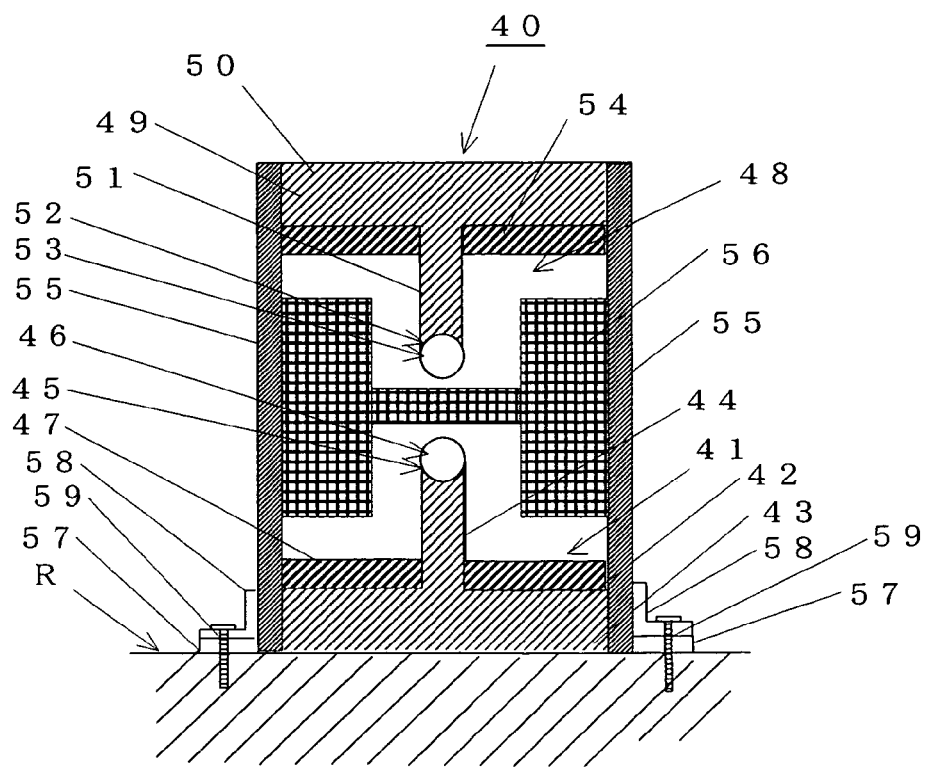
FIG. 11 is a diagram showing a method for installing the road-ice detecting sensor of FIG. 10.

FIG. 11 shows a first method for installing the road-ice detecting sensor 40 according to the present embodiment.

Initially, the temperature sensor 43 of the road-specific ice detecting sensor unit 41 is placed on the road R, and a caulking compound 57 for avoiding air exchange with the outside is arranged around the temperature sensor 43. L fittings 58 such as SUS angles are attached to the side plates 55 on both sides. Bolts 59 are driven into the road R from above the L fittings 58, thereby holding down the road-ice detecting sensor 40 with the L fittings 58. Consequently, the bolts 59 function as anchors.

Figure 12:
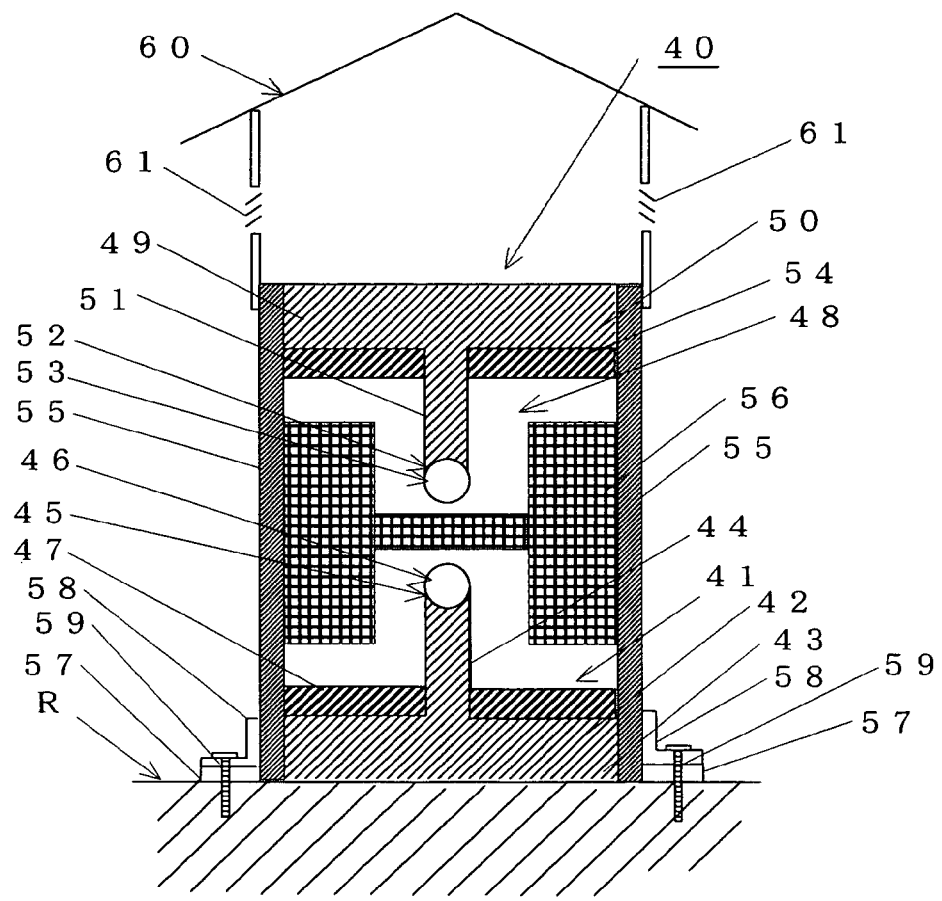
FIG. 12 is a diagram showing a method for installing the road-ice detecting sensor of FIG. 10.
Figure 13:
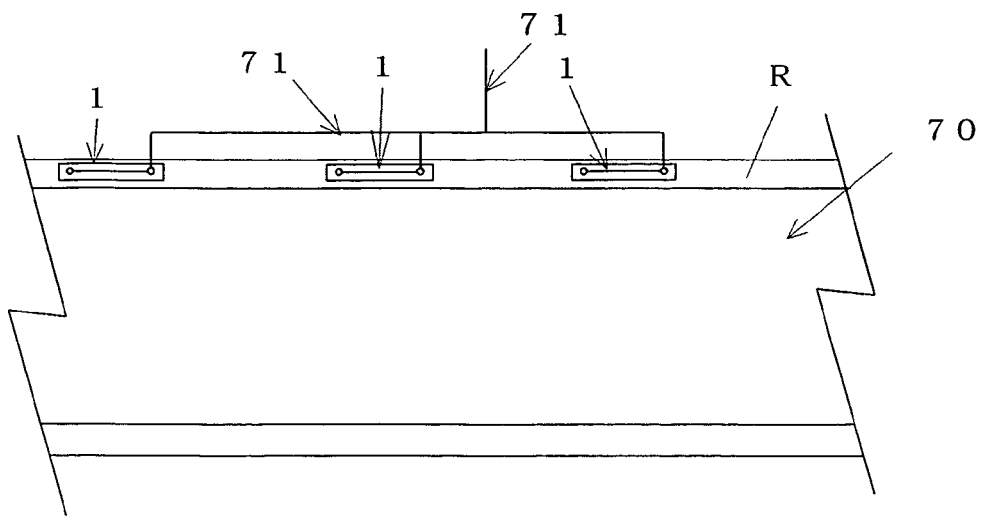
FIG. 13 is a diagram showing an example where the road-ice detecting sensors of FIG. 1 are installed on a runway.
Figure 14:
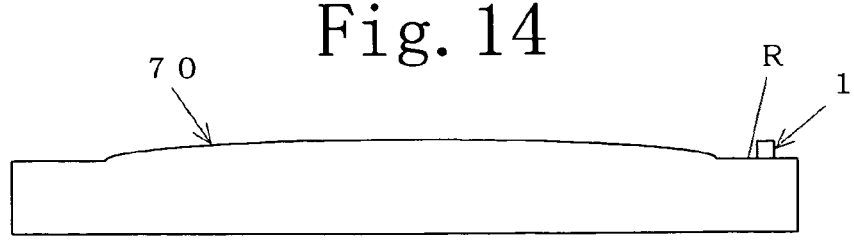
FIG. 14 is a cross-sectional view of the runway of FIG. 13.
Figure 15:
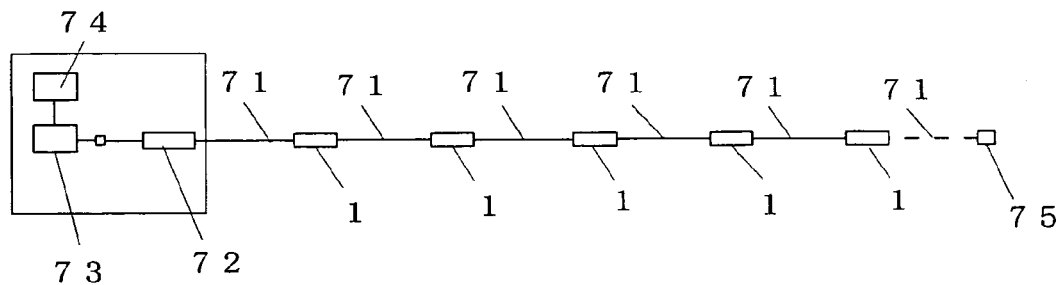
FIG. 15 is a block diagram corresponding to FIG. 13.

FIG. 12 shows a second method for installing the road-ice detecting sensor 40 according to the present embodiment.

A roof member 60 for radiational cooling is disposed above the road-ice detecting sensor 40 installed in FIG. 11. The roof member 60 has ventilation louvers 61 in its walls.

According to this installation method, the roof member 60 can surely prevent radiation from the road targeted for ice detection. The FBG 53 can thus detect the outdoor air temperature on the road targeted for ice detection accurately.

Needless to say that according to this installation method, the temperature sensor 43 of the road-specific ice detecting sensor unit 41 is firmly fixed onto the road targeted for ice detection so that the FBG 46 can accurately measure the temperature of the road targeted for ice detection.

Next, a road-ice detecting method using the road-ice detecting sensor 1 according to the first embodiment of the present invention will be described with reference to FIGS. 13 to 16B.

Figure 16A:
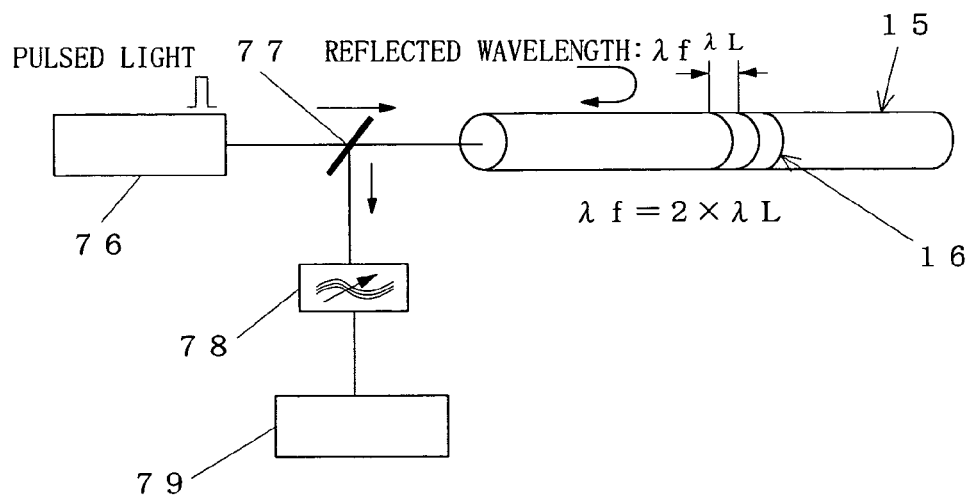
FIG. 16A is an explanatory diagram showing a light wavelength measuring device in FIG. 15.
Figure 16B:
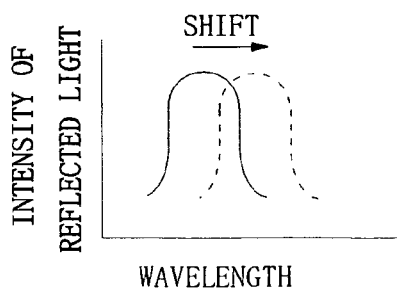
FIG. 16B is an explanatory diagram showing a wavelength shift which is proportional to the amount of elongation strain of the FBG.

Initially, road-ice detecting sensors 1 with different wavelengths are arranged at predetermined intervals along the surface R of a runway 70 by the installation method shown in FIG. 6. The road-ice detecting sensors 1 are connected to each other via an optical cable 71 through optical connectors 18 or via fusion-splicing optical cables. An optical junction box, or an optical switch 72, and a light wavelength measuring device 73 are attached to one of the ends of the optical cable 71 connected. An optical terminal box 75 is attached to the other end. The light wavelength measuring device 73 is connected with a PC 74 for display. As shown in FIG. 16A, the light wavelength measuring device 73 includes a light pulse transmitter 76, a half mirror 77, a narrow-band variable filter 78, and a photoreceiver 79.

Next, pulsed light emitted from the light pulse transmitter 76 is incident on each of the road-ice detecting sensors 1 through the optical cable 71. The FBG 16 in each road-ice detecting sensor 1 causes resonance reflection of a component having a wavelength twice the interval $\lambda L$ alone. This reflected light is extracted through the half mirror 77 by using the characteristic that the wavelength of the reflected light shifts in proportion to the amount of elongation strain of the FBG 16. The reflected light further passes through the narrow-band variable filter 78 and is sensed by the photoreceiver 79. Consequently, it is possible to measure the amounts of elongation strain of the FBGs 16 on the optical fibers 15 of the respective road-ice detecting sensors 1 from the degrees of shift in wavelength.

Now, description will be given of a determination on road icing.

From a moisture meter (not shown) installed on the surface R of the runway 70 and/or information from AMEDAS (Automated Meteorological Data Acquisition System), it is determined if the road is wet and if the outdoor air temperature is lower than or equal to 5° C. If these conditions hold, the road is determined to be icy when the surface temperature falls to or below 0° C. and is considered to be in a steady state with no temperature variations not following variations in the outdoor air temperature.

As described above, the road icing can thus be detected with reliability.

According to the present embodiment, the road-ice detecting sensors 1 are fixed simply as arranged along the road R of the runway 70, and thus will not require much labor for removal or relocation during repair works thereto. Moreover, it will eliminate the necessity to lay the optical cable 71 again.

Note that the present embodiment has dealt with the case where the road-ice detecting sensors 1 are installed by the installation method shown in FIG. 6, however, the present invention is not limited thereto. The road-ice detecting sensors 1 may be installed by the installation method of FIG. 7 or 8. The installation method shown in FIG. 9 may also be used to install road-ice detecting sensors 1 which can sense the outdoor air temperature. Moreover, instead of the road-ice detecting sensors 1, road-ice detecting sensors 40 may be installed by using the installation method of FIG. 11 or 12. In this case, the road icing and the outdoor air temperature both can be detected simultaneously, thereby eliminating the need for an additional operation for detecting the outdoor air temperature.

Figure 17:
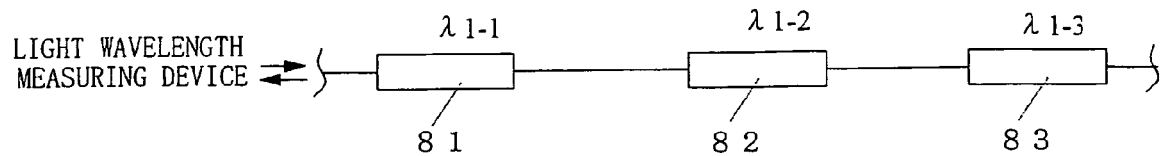
FIG. 17 is an explanatory diagram showing another configuration of the present invention.

The foregoing embodiments have dealt with the cases where temperature variations are detected by measuring the amounts of shift of the FBGs having different wavelengths. Nevertheless, as shown in FIGS. 17 and 18, for example, road-ice detecting sensors 81, 82, and 83 may have the same wavelengths λ1-1, λ1-2, and λ1-3, respectively.

Figure 18:
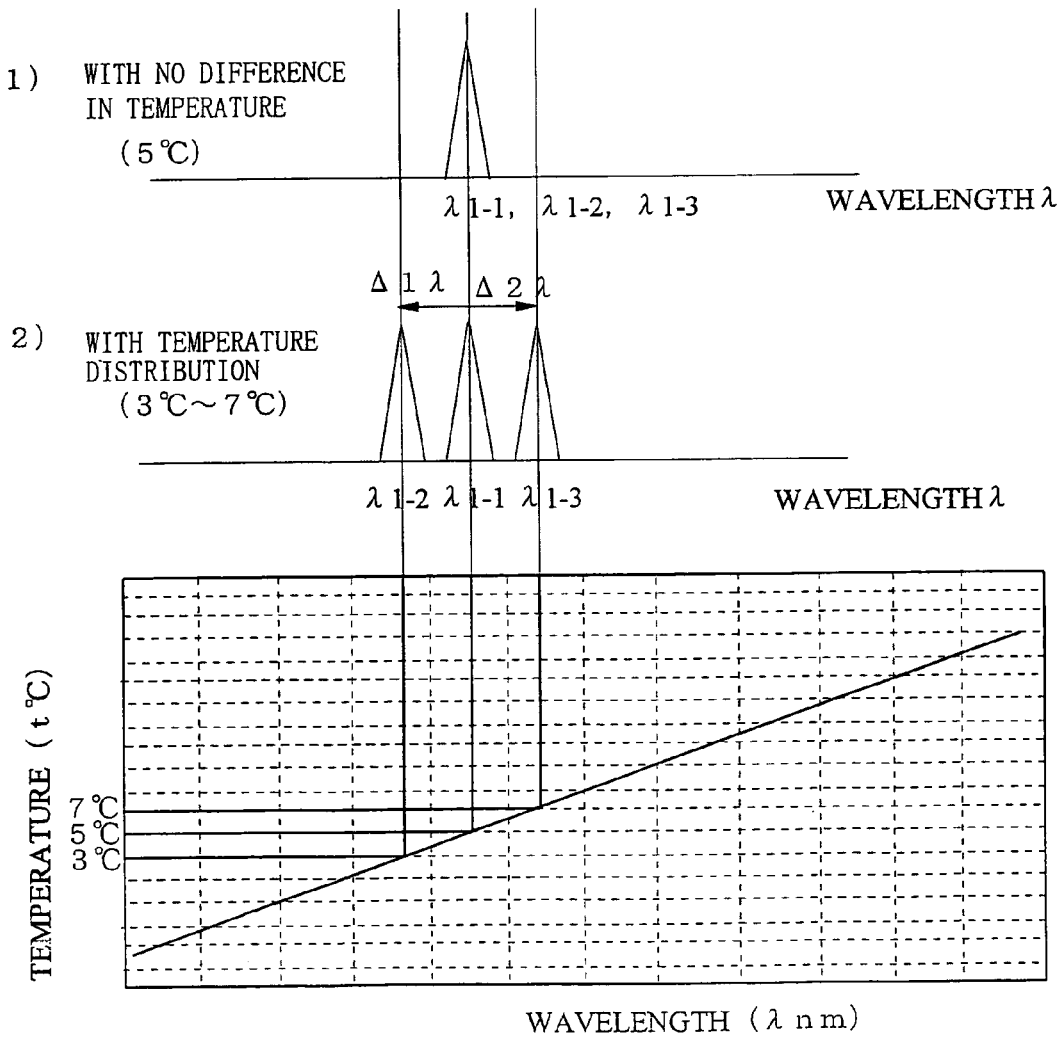
FIG. 18 is an explanatory diagram showing temperature detection of FIG. 17.

In this case, as shown in FIG. 18, the road-ice detecting sensors 80, 81, and 82 provide the same reflected light (5° C.) if there is no difference in temperature. With a difference in temperature (3° C. to 7° C.), the beams of reflected light with respective shifts are detected. This makes it possible to detect the temperature distribution in the road-ice detecting sensors 80, 81, and 82.

According to this method, it is possible to measure a temperature distribution by using an arbitrary number of road-ice detecting sensors irrespective of the number thereof determined on the basis of FBGs. For example, as shown in FIGS. 17 and 18, road-ice detecting sensors 81, 82, and 83 with the same wavelengths may be connected into groups (ten to fifteen groups) so that each group includes a plurality of road-ice detecting sensors. Here, it is possible to measure temperature distributions group by group, and detect icing group by group.

Incidentally, the single light wavelength measuring device 73 used in the foregoing embodiments can only handle up to ten to fifteen FBGs with respective different center wavelengths. In contrast, according to this method of detecting temperature distributions, the number of road-ice detecting sensors is increasable by connecting FBGs with the same wavelengths. This makes it possible to measure a temperature distribution over a wider range or greater distances.

The invention is not limited to the above embodiments and various modifications may be made without departing from the spirit and scope of the invention. Any improvement may be made in part or all of the components.

What is claimed is:

1. A road-ice detecting sensor comprising:
   a temperature sensing member being T-shaped, the temperature sensing member being made of a highly heat conductive metal and having a temperature sensor with a caulking compound attachable surroundings to be grounded onto a road surface and a fin part erected on said temperature sensor, a tip of the fin part being plane and parallel with the temperature sensor;
   an optical fiber having a fiber Bragg grating (FBG) bonded onto said plane of the fin part of said temperature sensing member, the FBG with a peak wavelength in light reflex varying according to strain; and
   a case having a heat insulating member surrounding the fin part of said temperature sensing member and said optical fiber.

2. A method for installing a road-ice detecting sensor comprising the steps of:
   placing a temperature sensor of said road-ice detecting sensor on a road;
   placing a plate member over a case of said road-ice detecting sensor; and
   fastening said plate member and the road with a bolt which are pressed into said road, wherein said road-ice detecting sensor includes:
   a temperature sensing member being T-shaped and made of a highly heat conductive metal and having a temperature sensor with a caulking compound attachable surroundings to be grounded onto a road surface;
   a fin part erected on said temperature sensor, a tip of the fin part being plane and parallel with said temperature sensor;
   an optical fiber having a fiber Bragg grating (FBG) bonded onto the plane of the fin part of said temperature sensing member, the FBG with a peak wavelength in light reflex varying according to strain; and
   a case having a heat insulating member surrounding the fin part of said temperature sensing member and the optical fiber.

3. A method for installing a road-ice detecting sensor comprising the steps of:
   placing a temperature sensor of said road-ice detecting sensor on a road;
   placing a plate member of a dome shape over a case of said road-ice detecting sensor; and
   fastening said plate member and the road with a bolt which are pressed into said road, wherein said road-ice detecting sensor includes:
   a temperature sensing member being T-shaped and made of a highly heat conductive metal and having a temperature sensor with a caulking compound attachable surroundings to be grounded onto a road surface;
   a fin part erected on said temperature sensor, a tip of the fin part being plane and parallel with said temperature sensor;
   an optical fiber having a fiber Bragg grating (FBG) bonded onto the plane of the fin part of said temperature sensing member, the FBG with a peak wavelength in light reflex varying according to strain; and
   a case having a heat insulating member surrounding the fin part of said temperature sensing member and the optical fiber.

4. A method for installing a road-ice detecting sensor comprising the steps of:
   placing a temperature sensor of said road-ice detecting sensor on a road;
   attaching L fittings to both sides of a case of said road-ice detecting sensor; and
   fastening the L fittings and the road with bolts which are pressed into said road, wherein said road-ice detecting sensor includes:
   a temperature sensing member being T-shaped and made of a highly heat conductive metal and having a temperature sensor with a caulking compound attachable surroundings to be grounded onto a road surface;
   a fin part erected on said temperature sensor, a tip of the fin part being plane and parallel with said temperature sensor;
   an optical fiber having a fiber Bragg grating (FBG) bonded onto the plane of the fin part of said temperature sensing member, the FBG with a peak wavelength in light reflex varying according to strain; and
   a case having a heat insulating member surrounding the fin part of said temperature sensing member and the optical fiber.

5. A method for installing a road-ice detecting sensor comprising the steps of:
placing a case on a road such that a temperature sensing unit of a temperature sensor is directed to the air; and
disposing a roof member for radiational cooling above said temperature sensor, wherein said road-ice detecting sensor includes:
a temperature sensing member being T-shaped and made of a highly heat conductive metal and having a temperature sensor with a caulking compound attachable surroundings to be grounded onto a road surface;
a fin part erected on said temperature sensor, a tip of the fin part being plane and parallel with said temperature sensor;
an optical fiber having a fiber Bragg grating (FBG) bonded onto the plane of the fin part of said temperature sensing member, the FBG with a peak wavelength in light reflex varying according to strain; and
a case having a heat insulating member surrounding the fin part of said temperature sensing member and the optical fiber.

6. A road-ice detecting sensor comprising:
a road-specific ice detecting sensor unit including a temperature sensing member being T-shaped, made of a highly heat conductive metal, and having a temperature sensor to be grounded onto a road and a fin part erected on said temperature sensor;
an optical fiber having a fiber Bragg grating (FBG) with a peak wavelength in light reflex varying according to strain, the FBG being bonded onto the fin part of said temperature sensing member;
an outdoor air temperature detecting sensor unit including a temperature sensing member being T-shaped, made of a highly heat conductive metal, and having an outdoor air temperature sensor disposed directing to the air and a fin part erected on said outdoor air temperature sensor;
an optical fiber having an FBG bonded onto the fin part of said temperature sensing member; and
side plates having a heat insulating member surrounding the fin parts and optical fibers of said road-specific ice detecting sensor unit and of said outdoor air temperature detecting sensor unit, wherein said road-specific ice detecting sensor unit and said outdoor air temperature detecting sensor unit are attached to said side plates such that their respective FBGs face to each other.

7. A method for installing a road-ice detecting sensor comprising the steps of:
placing a temperature sensor of a road-specific ice detecting sensor unit of said road-ice detecting sensor on a road;
attaching L fittings to both sides of side plates; and
fastening the L fittings and the road with bolts which are pressed into said road, wherein said road-ice detecting sensor includes:
a road-specific ice detecting sensor unit including a temperature sensing member being T-shaped and made of a highly heat conductive metal and having a temperature sensor to be grounded onto a road surface;
a fin part erected on said temperature sensor;
an optical fiber having a fiber Bragg grating (FBG) with a peak wavelength in light reflex varying according to strain, the FBG being bonded onto the fin part of said temperature sensing member;
an outdoor air temperature detecting sensor unit including a temperature sensing member being T-shaped and made of a highly heat conductive metal and having an outdoor air temperature sensor disposed directing to the air and a fin part erected on said outdoor air temperature sensor;
an optical fiber having the FBG bonded onto the fin part of said temperature sensing member; and
said side plates having a heat insulating member surrounding the fin parts and optical fibers of said road-specific ice detecting sensor unit and of said outdoor air temperature detecting sensor unit.

8. A method for installing the road-ice detecting sensor according to claim 7, further comprising the step of:
disposing a roof member for radiational cooling above the outdoor air temperature sensor of said outdoor air temperature detecting sensor unit.

9. A road-ice detecting method comprising the steps of:
placing temperature sensors of a predetermined number of road-ice detecting sensors on a road;
placing plate members over the cases of said road-ice detecting sensors;
fastening said plate members and the road with bolts which are pressed into said road;
connecting said road-ice detecting sensors via an optical cable; and
launching pulsed light into one end of the optical cable and receiving beams of reflected light from said road-ice detecting sensors to measure temperature of the road, wherein said road-ice detecting sensors each includes:
a temperature sensing member being T-shaped and made of a highly heat conductive metal and having a temperature sensor with a caulking compound attachable surroundings to be grounded onto a road surface;
a fin part erected on said temperature sensor, a tip of the fin part being plane and parallel with said temperature sensor;
an optical fiber having a fiber Bragg grating (FBG) bonded onto the plane of the fin part of said temperature sensing member, the FBG with a peak wavelength in light reflex varying according to strain; and
a case having a heat insulating member surrounding the fin part of said temperature sensing member and the optical fiber.

10. A road-ice detecting method comprising the steps of:
placing temperature sensors of a predetermined number of road-ice detecting sensors on a road;
placing plate members of a dome shape over the cases of said road-ice detecting sensors;
fastening said plate members and the road with bolts which are pressed into said road;
connecting said road-ice detecting sensors via an optical cable; and
launching pulsed light into one end of the optical cable and receiving beams of reflected light from said road-ice detecting sensors to measure temperature of the road, wherein said road-ice detecting sensors each includes:
a temperature sensing member being T-shaped and made of a highly heat conductive metal and having a temperature sensor with a caulking compound attachable surroundings to be grounded onto a road surface;
a fin part erected on said temperature sensor, a tip of the fin part being plane and parallel with said temperature sensor;
an optical fiber having a fiber Bragg grating (FBG) bonded onto the plane of the fin part of said temperature sensing member, the FBG with a peak wavelength in light reflex varying according to strain; and a case having a heat insulating member surrounding the fin part of said temperature sensing member and the optical fiber.

11. A road-ice detecting method comprising the steps of:

placing temperature sensors of a predetermined number of road-ice detecting sensors on a road;

attaching L fittings to both sides of respective cases of said road-ice detecting sensors;

fastening the L fittings and the road with bolts which are pressed into said road;

connecting said road-ice detecting sensors via an optical cable; and launching pulsed light into one end of the optical cable and receiving beams of reflected light from said road-ice detecting sensors to measure temperature of the road, wherein said road-ice detecting sensors each includes:

a temperature sensing member being T-shaped and made of a highly heat conductive metal and having a temperature sensor with a caulking compound attachable surroundings to be grounded onto a road surface;

a fin part erected on said temperature sensor, a tip of the fin part being plane and parallel with said temperature sensor;

an optical fiber having a fiber Bragg grating (FBG) bonded onto the plane of the fin part of said temperature sensing member, the FBG with a peak wavelength in light reflex varying according to strain; and a case having a heat insulating member surrounding the fin part of said temperature sensing member and the optical fiber.

12. A road-ice detecting method comprising the steps of:

placing temperature sensors of a predetermined number of road-ice detecting sensors on a road such that the temperature sensors are directed to the air;

disposing a roof member for radiational cooling above the outdoor air temperature sensor of each outdoor air temperature detecting sensor unit;

connecting said road-ice detecting sensors via an optical cable; and launching pulsed light into one end of the optical cable and receiving beams of reflected light from said road-ice detecting sensors to measure temperature of the road, wherein said road-ice detecting sensors each includes:

a temperature sensing member being T-shaped and made of a highly heat conductive metal and having a temperature sensor with a caulking compound attachable surroundings to be grounded onto a road surface;

a fin part erected on said temperature sensor, a tip of the fin part being plane and parallel with said temperature sensor;

an optical fiber having a fiber Bragg grating (FBG) bonded onto the plane of the fin part of said temperature sensing member, the FBG with a peak wavelength in light reflex varying according to strain; and a case having a heat insulating member surrounding the fin part of said temperature sensing member and the optical fiber.

13. A road-ice detecting method comprising the steps of:

placing temperature sensors of road-specific ice detecting sensor units of a predetermined number of road-ice detecting sensors on a road;

attaching L fittings to both sides of the respective side plates;

fastening the L fittings and the road with bolts which are pressed into said road;

connecting said road-ice detecting sensors via an optical cable; and launching pulsed light into one end of the optical cable and receiving beams of reflected light from said road-ice detecting sensors to measure temperature of the road, wherein said road-ice detecting sensors each includes:

a road-specific ice detecting sensor unit including a temperature sensing member being T-shaped, and made of a highly heat conductive metal and having a temperature sensor to be grounded onto a road surface;

a fin part erected on said temperature sensor;

an optical fiber having a fiber Bragg grating (FBG) with a peak wavelength in light reflex varying according to strain, the FBG being bonded onto the fin part of said temperature sensing member;

an outdoor air temperature detecting sensor unit including a temperature sensing member being T-shaped and made of a highly heat conductive metal and having an outdoor air temperature sensor disposed directing to the air and a fin part erected on said outdoor air temperature sensor;

an optical fiber having the FBG bonded onto the fin part of said temperature sensing member; and said side plates having a heat insulating member surrounding the fin parts and optical fibers of said road-specific ice detecting sensor unit and said outdoor air temperature detecting sensor unit in which a road-specific ice-detecting sensor unit and said outdoor air temperature detecting sensor unit are attached to said side plates such that their respective FBGs face each other.

14. The road-ice detecting method according to claim 13, further comprising the step of disposing a roof member for radiational cooling above the outdoor air temperature sensor of each outdoor air temperature detecting sensor unit.

15. A road-ice detecting sensor comprising:

a temperature sensing member being T-shaped and made of a highly heat conductive metal and having a temperature sensor to be grounded onto a road;

a fin part erected on said temperature sensor;

an optical fiber having a fiber Bragg grating (FBG) bonded onto the fin part of said temperature sensing member, the FBG with a peak wavelength in light reflex varying according to strain; and a case composed of attaching a heat insulating member, which is surrounding the fin part and the optical fiber of said temperature sensing member after said temperature sensing member, having the optical fiber bonded thereto, is coated with a waterproof material of gel texture over said temperature sensor.

16. A road-ice detecting method comprising the steps of:

connecting road-ice detecting sensors via an optical cable; and launching pulsed light into one end of an optical cable and receiving beams of reflected light from said road-ice detecting sensors to measure temperature of the road, wherein said road-ice detecting sensors each includes:

a temperature sensing member being T-shaped and made of a highly heat conductive metal and having a temperature sensor to be grounded onto a road;

a fin part erected on said temperature sensor;

an optical fiber having a fiber Bragg grating (FBG) bonded onto the fin part of said temperature sensing member, the FBG with a peak wavelength in light reflex varying according to strain; and a case composed of attaching a heat insulating member, which is surrounding the fin part and the optical fiber of said temperature sensing member after said temperature sensing member, having the optical fiber bonded thereto, is coated with a waterproof material of gel texture over said temperature sensor.

* * * * *